Feb. 7, 1939.  F. S. DENNEEN ET AL  2,145,864
METHOD OF MAKING HARDENED SURFACE ARTICLES
Original Filed July 12, 1934   2 Sheets-Sheet 1
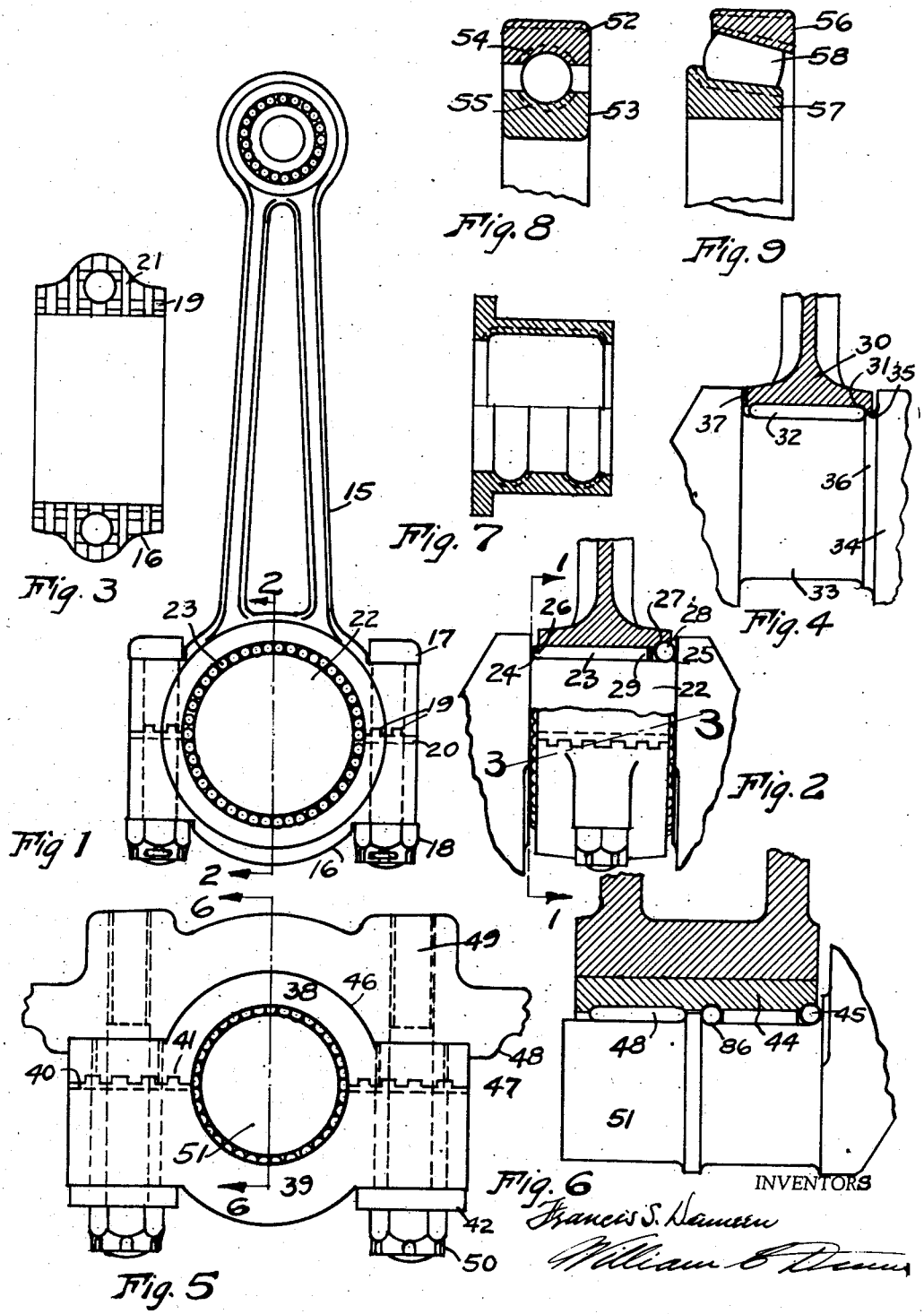

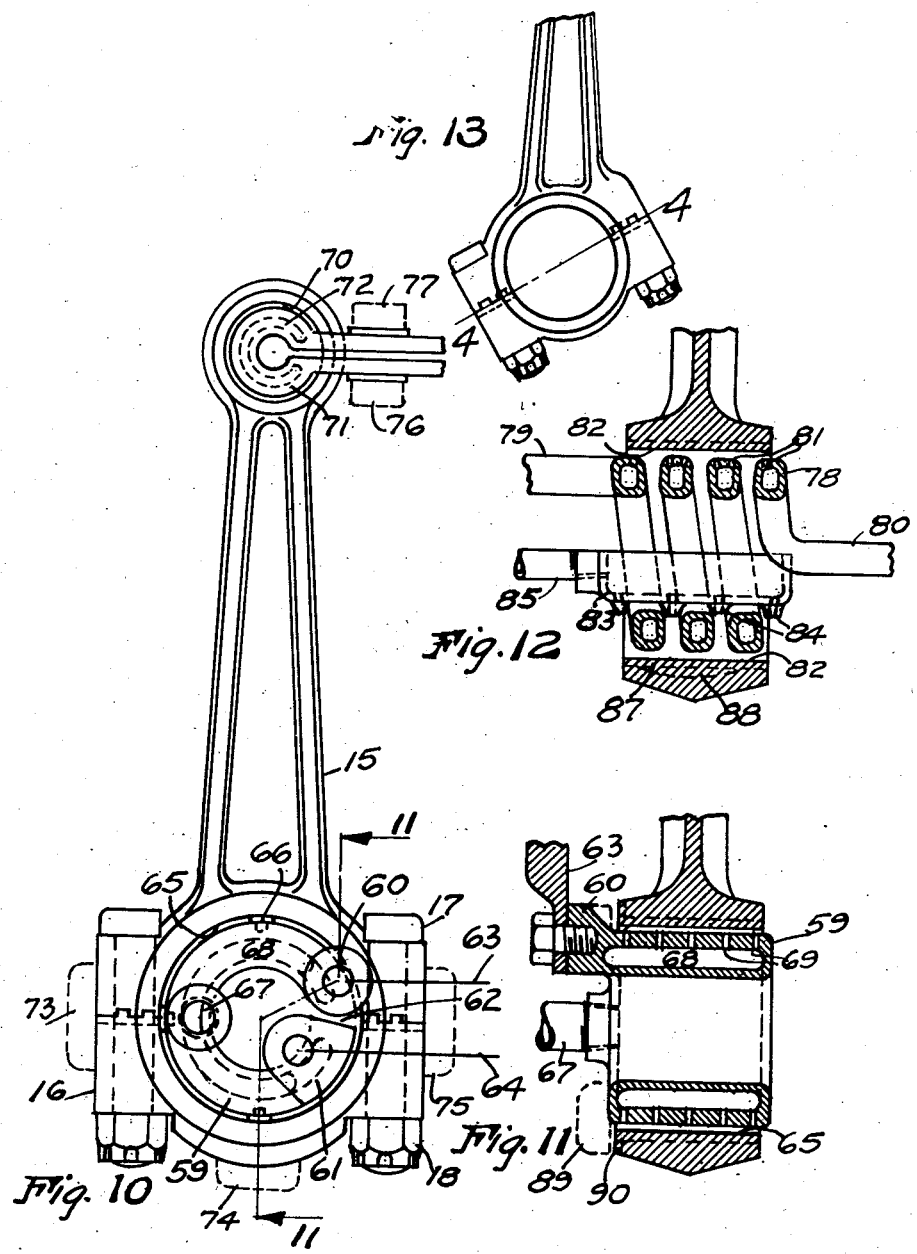

Patented Feb. 7, 1939

2,145,864

UNITED STATES PATENT OFFICE 2,145,864

METHOD OF MAKING HARDENED SURFACE ARTICLES

Francis S. Denneen, Cleveland, and William C. Dunn, Shaker Heights, Ohio, assignors to The Ohio Crankshaft Company, Cleveland, Ohio, a corporation of Ohio Application July 12, 1934, Serial No. 734,722
Renewed May 9, 1938

13 Claims. (Cl. 29—148.4)

The present invention is a further improvement, and is related in some elements to those shown and described in copending applications Serial Numbers 689,904, 718,002, and 718,003, and pertains especially to bearings and the like in which a hardened interior surface is necessary or desirable.

In a bearing such as in a connecting rod, for instance, it is sometimes highly desirable and in many cases necessary that the bearing surfaces be very hard and at the same time the remainder of the connecting rod must be strong and reasonably ductile to avoid fracture or breakage. Heretofore, in such cases it has been necessary to resort to the use of liners, or sleeves, first hardened, then inserted and secured in some manner to the connecting rod proper. This procedure has been expensive because of the required extra parts and extra machining, and frequently failures have resulted, due to the fact that the liners, being inserted in restricted spaces, were necessarily thin. Further difficulty has been experienced in making the liner conform closely to the contour of the recess in the rod. An inserted shell or bushing invariably distorts and goes out of shape after being hardened, making it almost impossible to get a perfect fit between the shell and the rod. This is true of multipart shells, split shells or cylindrical shells. The use of inserted shells has a further objection when employed with rollers, trouble tending to develop at the joint where the edges of the shells come together. These thin shells, being necessarily hard, check and break away very readily as the rollers pass over the joints under load, and even if the bearing were made continuous, such as by the use of a single piece cylindrical shell, the shell being thin and extremely hard, frequently breaks, there being no bond between the shell and the body of the rod to add strength to the hardened portion. It has been impossible, therefore, to successfully use roller or other types of so-called anti-friction bearings in a great many cases where this type of bearing would be highly desirable. Up to the present time, therefore, it has been necessary to be limited to the use of plain bearings with comparatively high friction losses requiring a very exact fitting, very careful lubrication and frequent adjustment. All these difficulties may be overcome by the use of suitable roller or anti-friction bearings.

The chief object of this invention, therefore, is to provide a bearing with a strong body structure and a hardened wearing surface integral with that body.

A further object is to provide means whereby such hardened surface bearings may be used under different conditions and for varying purposes, including the employment of anti-friction rollers or other anti-friction means. A further object is to provide a method and the equipment necessary to produce an article having the qualities described.

A further object is to provide a bearing in which the outer member or race may be assembled of more than one part, but so arranged that these parts will be maintained in correct alignment with respect to each other, and offer a path or raceway substantially equivalent to a continuous piece.

A further object is to provide a method for producing such a surface hardened article which is rapid, inexpensive and reliable, and with the desired uniformity in the product thus produced.

While in the accompanying drawings and specification we have illustrated and described our invention as applied to certain purposes, we do not limit ourselves to the constructions shown and described. From the disclosure herein, obviously, many modifications and other uses would readily suggest themselves to those skilled in the art.

In the annexed drawings:—

Fig. 1 illustrates a typical application of our invention to a connecting rod, this being a partial sectional view taken substantially on line 1—1 of Fig. 2. Fig. 2 is a view partly in section on line 2—2 of Fig. 1. Fig. 3 is a detailed plan view of the connecting rod cap shown in Figures 1 and 2. Fig. 4 is a fragmentary section similar to Fig. 2, but illustrating a modification of the connecting rod shown in the former figures. Fig. 5 is an elevation of an application of our invention to a main bearing of an engine. Fig. 6 is a section substantially on line 6—6 of Fig. 5. Fig. 7 illustrates a bearing race produced by our process, the upper part illustrating an arrangement adapted to the use of rollers, while the lower part illustrates a construction adaptable to the use of steel balls. Fig. 8 is a fragmentary section of a typical ball bearing, showing the location of the hardened sections relative to the ball. Fig. 9 is a fragmentary section similar to Fig. 8, but showing application to a roller bearing. Fig. 10 is an elevation of a connecting rod, showing the heating and quenching means in operating relationship thereto. Fig. 11 is a section substantially on line 11—11 of Fig. 10. Fig. 12 is a section similar to Fig. 11, but illustrating another form of the heating and quenching means. Fig. 13 shows a modified form of connecting rod end.

Referring now particularly to Figures 1, 2 and 3, the connecting rod 15 has the cap 16 secured thereto by means of bolts 17 and nuts 18. For the purpose of preventing any movement of the cap relative to the rod after assembly, axially extending ribs 19 on the cap engage corresponding grooves in the rod and transverse ribs 20 on the rod engage corresponding grooves 21 in the cap.

In the usual process of manufacture, the connecting rod 15 and cap 16 are forged as a single unit from steel having a carbon content sufficiently high to respond to a hardening heat treatment. This rod forging is heat treated to provide strength and sufficient ductility to prevent breakages in service, this heat treatment leaving the material of the rod soft enough to be readily machined. After this heat treatment, the cap is separated from the rod by a sawing or slotting operation, and the grooves and ribs 19, 20 and 21 above referred to are provided by a surface broaching operation. The broach for producing these ribs and grooves is usually provided with cutting edges adapted to rough form the inner cylindrical surface of the bearing. After the broaching operations have been completed, the cap is placed in position on the rod with the ribs and grooves interlocking, and the bolts 17 are inserted in holes previously provided in the rod and cap, and the nuts 18 are employed to bring the cap into firm and secure assembled relationship with the main body of the rod. The rod is then hardened on its interior surface by the process and apparatus hereinafter described in connection with Figures 10 and 11. With the cap still in the assembled relationship on the rod, the interior cylindrical surface is then ground or otherwise finished to an accurate cylindrical form of correct dimensions.

With the connecting rod thus finished, the nuts 18 may be removed and the cap disassembled, for the purpose of assembling it to a crank pin bearing 22, the crank pin bearing previously having been hardened and ground preferably by the method illustrated and described in the co-pending applications above referred to. Rollers as illustrated at 23 are placed in position in both the cap and the rod, preferably being held there during the process of assembly by the use of an adhesive substance such as Vaseline or other suitable grease. The ribs and grooves are brought into their former assembled position, which will assure the accuracy as to alignment and contour of the interior cylindrical surface of the rod and the correct working clearance between this cylindrical surface and the crank pin 22, so that the rollers 23 will function quietly and correctly.

In the manufacture of the crankshaft, fillets as shown at 24 and 25 are nearly always employed at the intersection of the crank pin with the crank cheeks. The ends of the rollers 23 are formed as at 26 to cooperate with this fillet with suitable working clearances. If it is desired to hold the connecting rod against longitudinal travel by means provided on the shaft instead of relying on its engagement with a piston at its other end as a means of location, the connecting rod is then so formed at 27 as to engage the steel balls 28. The circumferentially extending groove at 27 is provided in a rough form before hardening and this groove may be hardened at the same time the interior cylindrical surface is hardened. After hardening, a grinding or lapping process finishes this groove, preferably at the same time as the finishing of the interior cylindrical surface. When the steel balls 28 are employed, their diameters in relation to the diameters of the rollers 23 and the spacing of the balls are such as to prevent the rollers from sliding axially between the balls. However, to prevent any interference between the ends of the rollers and the steel balls which may result from a substantial difference in their diameters, a spacing ring such as 29 may be employed. When the steel balls are used, the fillet at the end of the crank pin is of such radius as to provide the necessary race for the balls.

An alternative means for locating the connecting rod on the crank pin is illustrated in Fig. 4. In this construction the inner cylindrical surface of the connecting rod 30 is recessed before hardening, and after hardening this surface is finished by grinding or otherwise to provide a suitable working fit for the rollers 32. In this construction, the fillet on the crank pin 33 is displaced a sufficient distance from the crank cheek 34 to provide clearance for the sides of the connecting rod, and a second fillet as at 35 is employed to join the step 36 with this cheek. If it is desired to locate the connecting rod without the use of the steel balls or the recessed inner surface, a thrust ring usually made of bronze is employed as shown at 37. This ring may be secured to the face of the connecting rod by the same heating process as is employed for the hardening operation.

The piston pin bearing, i. e., the surface in the opening at the other end of the connecting rod may be hardened by the same process as used in hardening the opening in the lower end just described, and if desired, simultaneously with the hardening of this end.

A bearing of the type above described as applied to a connecting rod may be employed for other purposes such as for main crankshaft bearings. Such a bearing is illustrated in Figures 5 and 6. In this case, the upper bearing shell 38 is made of steel having a suitable carbon content, and in its manufacturing process replaces the upper half of the connecting rod as above described, the bearing cap 39 taking the place of the connecting rod cap 16. The grooves and ribs shown at 40 and 41 correspond to those shown at 19 and 20 in the connecting rod. The bearing members 38 and 39 are machined, hardened and ground as in the above described process for the connecting rod, and with the tubular screw 42 holding them in assembled position. By reassembling these members together with the rollers 43 and 44 and the steel balls 45 in place on the shaft, it is possible to assemble a complete set of bearings on the crankshaft before the crankshaft is assembled into the crank case or other piece of machinery in which it is to be used. In assembling the crankshaft to the crank case, the arcuate surface 46 engages a corresponding surface provided in the crank case and the ends of the bearing as at 47 engage the locating lugs 48 to prevent transverse movements after assembly. The studs 49 pass through the hollow screws 42, and the nuts 50 hold the bearing assembly securely in place in the crank case. Thus the shaft bearing 51 is supported on rollers engaging hardened and accurately finished and located bearing surfaces.

Since the above mentioned illustrations refer specifically to bearings used with crankshafts, it is desired to point out that numerous other applications of a similar nature may be made. A shell of the form illustrated in the lower part of Fig. 7 may be provided, having suitable diameter and a contour recess for engaging steel balls. After rough machining, such portions of the inner surface may be hardened as is desired, leaving the unhardened metal tough and ductile for mechanical strength. These surfaces thus hardened may then be ground to any desired finish as to smoothness, contour and accuracy. The same is true of the construction shown in the upper part of Fig. 7 in which provision is made for the use of a set of steel rollers.

In the manufacture of ball and roller bearings, particularly those of relatively large size, the hardening operation is frequently difficult to accomplish. The methods for the manufacture of ball or roller bearings used at present are subject to the following objections and troubles:—

A. It is difficult and almost impossible to make on a production scale bearings in which the hardened zones are uniform in depth, contour and hardness, and in which the hardened zone follows a predetermined depth contour.

B. If made with sufficiently hard wearing surfaces, it is difficult to produce the bearing parts so that they are free from internal stresses. These stresses often result in fractures or breakage of the wearing surfaces and sometimes of the entire piece.

C. It is impossible to produce bearing parts with sufficiently hard wearing surfaces and at the same time to impart to or leave in the unhardened portions certain desirable combined physical characteristics, including ductility, high elastic limit and high ultimate tensile strength.

As that part of the surface metal which is to engage the balls or rollers is the only part of these bearings which it is desired to have extremely hard, our process may be extended to cover bearings of this character. In Fig. 8 the interior portion of the outer race 52 may be hardened as well as the exterior of the inner race 53, the depth of the hardening being indicated by the broken lines 54 and 55.

In the roller bearing as shown in Fig. 9, the inner surface of the outer race 56 and the exterior surface of the inner race 57 are hardened and ground to provide the desired physical properties. Moreover, the roller 58 may have its surface hardened by our process to secure the desired resistance to surface wear and to provide the desired toughness and strength of the core to resist crushing.

Figures 10 and 11 show the apparatus and method used in providing the hardened inner surfaces for bearings and other articles. The connecting rod 15, with cap 16 held in assembled relationship therewith by bolts 17 and nuts 18, has the cylindrical conductor 59 inserted therein. This conductor is provided with terminals at 60 and 61 and with an axial slot at 62. High frequency currents, supplied by leads 63 and 64 are caused to flow circumferentially in the conductor and, by the hysteresis effect and the eddy currents generated in the inner surface 65 of the rod and cap, bring this surface rapidly to the temperature of decalescence, or such temperature as may be required to harden the heated zone. Insulating buttons or plugs 66 of refractory material which represent one of many possible spacing means, are arranged to insure the correct location of the conductor with respect to the article. A cooling and quenching fluid is introduced thru the pipe 67 into the jacket space 68. A suitable valve, (not shown) is used to control the flow of the fluid in this pipe. Orifices 69 in the outer wall of the conductor serve as means for projecting the quenching fluid onto the surface 65, thus cooling it with great rapidity and overcoming the detrimental heat insulating effect resulting from steam pockets or vesicles of gas which would be present if not prevented or eliminated by ample flow of coolant forcibly applied.

Simultaneously or consecutively as may be desired, with the hardening of the surface 65 at the one end of the rod 15, the surface 70 at the other end of the rod may be hardened by the use of conductor 71 which may be similar in form to conductor 59. This smaller conductor is usually provided with a jacket space 72 for fluid used in quenching the surface 70 after heating.

To secure a fully uniform temperature over the heated surfaces, it is desirable at times to oscillate or rotate the rod or other piece relative to the conductor during the heating interval. For this purpose the rod is carried by an oscillating or rotating member having elements 73, 74 and 75 engaging the rod. The oscillating or rotating member may have also suitable connections for moving the elements 76 and 77 carrying the conductor 71 so that relative movement of this conductor 71 and the surface 70 is provided simultaneously with the relative movement of the other end of the rod and the conductor 59, or the rod may be held stationary and the two conductors oscillated or rotated simultaneously relative to the rod by a connecting link between them, not shown.

For simplicity, conductor 59 may be replaced by a simple coil 78 shown in Fig. 12. High frequency current of relatively high density is supplied thru terminals 79 and 80 and provision is made for connecting to these terminals also a supply of suitable cooling fluid. If orifices such as 81 are provided and a suitably controlled supply valve is employed the fluid for cooling the coil may also be used for quenching the surface 82 after heating. If it is desired to employ a quenching fluid differing from the cooling medium in the coil, a drum 83 is inserted within the coil, serving to deliver the quenching fluid against the heated surface. This drum is provided with nozzles 84 disposed to project the quenching fluid between the coils and onto the heated surface 82. A suitably controlled valve, not shown, is provided in the feed pipe 85. The quenching fluid delivered by the nozzles 84 may be used also for cooling the conductor coil which, if desired, may then be made of solid section.

The balls or rollers for use in bearings shown or for similar uses may be hardened economically and correctly by means of suitable feeder and conveyor apparatus in combination with proper heating conductors and quenching means, preferably arranged for automatic operation and correctly timed and controlled.

It is also possible to secure a hard interior bearing surface in parts having a chemical composition which does not respond to a hardening treatment. In such cases a thin liner of suitable material is bonded or fused to the surface to be used as a ball or roller race, allowance being made in the part for the thickness of the liner. This liner is then hardened by the above described steps as if it were an actual part of the piece in which the hardened surface is required.

It is to be noted that the tongues and grooves employed for locating the cap on the rod or bearing are so proportioned as to equalize the amount of metal to be removed from these parts in the surface broaching operation and that the multiplicity of these grooves assures great accuracy in the relative location of these parts. In some cases it may be desired to relieve the closeness of the clearance such as between the shaft 22 and the rod 15 at the joint of the rod with cap 16. This additional clearance which is of the order of about one thousandth of an inch may be provided in the broaching operation and assures against any possible binding of the rollers at this point.

It is to be noted that in the construction shown in Figures 2 and 6 in which rollers are combined with balls a substantially full width of bearing is secured with favorable end thrust conditions. The bearing member such as 44 may be grooved at intermediate points for additional rows of balls such as shown at 86.

Under certain conditions it may be satisfactory to make the article to be hardened from a steel of a kind that, after having been heated, will harden readily upon being exposed to the air or upon being subjected to a blast or jet of air or other gas.

The cooling effect of the unheated core or of portions of the article adjacent to the heated areas serves to accelerate and aid in the cooling and hence in the hardening of the zones that have been heated for hardening, and, further, under certain conditions the hardening thus resulting may be sufficient without the necessity of cooling by air, quenching or other exterior cooling means.

Since with our process the heating is accomplished so quickly, and further, since the heat is localized in a comparatively shallow zone, the hardening under such conditions may be further accelerated and improved by refrigerating the article prior to the application of heat.

Referring to Figures 10, 11, and 12, it is entirely feasible to so arrange the heating conductors that they may be wholly or partially withdrawn from the position shown, either by movement of the conductor itself or by movement of the article, or both, thereby providing freer means for flow of the cooling air or gas against the heated surface.

While the heating conductors illustrated in Figures 11 and 12 are both shown as hollow and provided with apertures by which a cooling fluid may be directed against the heated surface, these apertures may be omitted and coolant circulated through so as to cool the conductor itself without any of that particular coolant being directed against the heated area on the article.

In Fig. 12 the coolant nozzle 83 could readily be so arranged as to remain in position for directing a cooling blast of air or other gas against the heated surface after withdrawal of the conductor.

The joint surface between the rod and the cap in which ribs 20 and grooves 21 have been shown may be located at an angle with the axis of the bore of the rod, so that the roller in passing the joint line does so progressively, thus avoiding shock and any tendency to wear or break away the surface at the joint line. The general direction of such joint may be approximately as indicated by the broken line 3—3 of Fig. 2. For purposes of balancing the forces tending to cause axial movement of the cap relative to the rod, the slopes of the joint surfaces at the two sides of the rod may be made opposite. With either of the last two constructions described, the arrangement of the joint may be modified so that the tongues and grooves do not appear in the bearing surface against which the rollers bear. The grooves and ribs in the joint faces between the cap and body are so arranged that the cap must always be put on in the same way. Hence the rod, having been once properly machined, in assembled condition the mating parts should always go together in one way only and in the same relative position in which the bore was finish machined.

To reduce pressures of the rollers on the surface at the joint as they pass the line between the rod and the cap, the joint surface may be disposed at an angle as indicated at 4—4 in Fig. 13. The angular position of this joint surface will depend upon the working pressures, the inertia forces and upon the proportions of the related moving parts. The interlocking of the ribs and grooves make this arrangement very satisfactory regardless of the connecting rod angularity and the angle of the joining surfaces.

It will be evident that numerous other and equivalent means for locating the cap on the rod or bearing member may be employed, such as separate keys, or dowels, or bolts made to fit closely in accurately machined holes.

Attention is directed to the fact that plain surface members may be employed instead of the balls or rollers shown and above described. These plain surface members may be made of bronze or other bearing metal and in one piece or from several parts, finished on both outer convex and inner concave surfaces so that they will "float" between the two hardened surfaces, i. e., so that they will move simultaneously or alternately in relation to both their inner and outer supporting surfaces. These members may also be formed to enhance the supporting effect and flow of the oil films.

It will be evident that such sectional plain shells may be keyed together to control or limit their relative movements and that passages for lubricant may be provided in the joints between the adjacent individual shells as well as by passages directly thru the walls of the shells. Shells of this character offer an opportunity for the use of suitable flanges or other fillet engaging ends adapted to locate the connecting rod or other member on its shaft. Further, by the use of multiple and concentric shells, a creeping action or a more rapid movement between shells is possible which not only distributes the wear of adjacent surfaces, but which enhances the distribution of lubricant. The use of shells having lead bronze on one side bonded to steel, and preferably with hardened steel on the other, has distinct advantage in such floating bearing shells.

With our apparatus and method, it is possible to control the depth, contour and hardness of the hardened zone, and to insure a proper bond between the hardened zone and the core. With a definite kind of steel susceptible to hardening, a definite contour for the electrode, a definite air gap, a definite current frequency in the electrode, and a definite current density in the electrode, the temperature and depth to which the affected zone is heated can be closely controlled merely by controlling the time of application of the heating current. Of course, one or more of the other variable factors than time may be altered for the purpose of controlling the heating. By spacing in one way the heating coils shown in Fig. 12, the hardened zone may be provided of uniform depth as shown at 87 or by other spacing of the coils this zone may be made to assume the form shown at 88. By a modification of the conductor 59 in Fig. 11, corresponding to the outline indicated by broken lines at 89, a hardened end zone such as shown at 90 can readily be provided.

The term "core" as employed in the following claims refers not only to the interior portion of the metal article having a hardened surface zone, but to such other parts of the article as may remain substantially unhardened.

Other modes of applying the principle of our invention may be employed instead of the ones explained, change being made as regards the means herein disclosed, provided those stated by any of the following claims or their equivalents be employed.

We, therefore, particularly point out and distinctly claim as our invention:

1. In a method of making bearings, the steps which consist of providing an outer race of complementary members, forming intersecting tongues and grooves on contiguous surfaces of the members, securing together the complementary members with the tongues and grooves in interlocking relationship, inserting a conductor in close spaced relationship with a surface of said race, passing high frequency current thru said conductor, and then projecting a quenching medium onto the surface of the race.

2. In a method of making a connecting rod having a removable cap the steps comprising, providing a forging, heat treating said forging to produce high strength and ductility, providing interlocking tongues and grooves in contiguous surfaces of the rod and cap, bringing the cap into assembled relationship with the rod, providing a bore at each end of the rod, inserting conductors in each of the bores, passing high frequency current thru said conductors, and then projecting a quenching medium onto a surface of the bores.

3. In a method of making a connecting rod having a removable cap the steps comprising, providing a forging, heat treating said forging to produce high strength and ductility, providing interlocking tongues and grooves in contiguous surfaces of the rod and cap, bringing the cap into assembled relationship with the rod, providing a bore at each end of the rod, inserting conductors in each of the bores, passing high frequency current thru the conductors whereby a surface of each bore and a side surface of the connecting rod are heated, and then projecting a quenching medium from said conductors onto the heated surfaces.

4. In a process for hardening the surface zone of a recess in an article, providing a bore, inserting a conductor in said bore in close proximity with a surface of the bore, passing high frequency current thru the conductor, relatively moving said conductor and said bore whereby heating is distributed substantially uniformly in a surface zone of the bore, and then projecting a quenching fluid substantially uniformly onto the said surface zone.

5. In a process for hardening the surface zone of a recess in an article, the steps which consist of providing a bore having a hardenable surface zone, inserting a conductor in said bore in close proximity with the surface zone, causing high frequency current to flow in said conductor whereby heating current is induced in the surface zone, and then projecting a quenching fluid onto said surface zone while withdrawing the conductor from the aforesaid bore.

6. In a process for hardening the surface zone of a recess in an article comprising providing a bore in an outer member, inducing heating current in a surface zone of the bore while other parts of the outer member remain substantially unheated, inducing heating current in a surface zone of an inner member while other parts of the inner member remain substantially unheated, inducing heating current in a surface zone of an intermediate member, then quenching the aforesaid surface zones substantially uniformly, and then bringing said members into assembled relationship.

7. In a process for hardening the surface zone of a recess in an article, the steps which consist of providing a bore, fusing a hardenable liner into said bore, inducing high frequency current in an inner surface zone of said liner, whereby said surface zone is heated to hardening temperature while material around said liner remains substantially unheated, and then uniformly quench the said surface zone.

8. In a process for hardening the surface zone of a recess in an article, the steps which consist of providing a bore having a hardenable surface zone, inserting a conductor in said bore, supplying high frequency current to said conductor, relatively moving said bore and said conductor whereby said conductor is removed from the bore and the bore is caused to surround a part of a quench delivery fitting, and then supplying quenching fluid to said fitting.

9. In a process for hardening the surface zone of a recess in an article, the steps which consist of providing a bore having a hardenable surface zone, inserting a conductor and quench delivery fitting substantially concentrically in said bore, supplying high frequency current to said conductor, withdrawing the conductor, and delivering quenching fluid from said fitting onto a surface of the bore.

10. A process for hardening a surface zone of a recess in an article comprising inserting an inductor in said recess in proximity with said surface zone, supplying high frequency current to said inductor and then quenching the entire heated surface area of said surface zone substantially simultaneously.

11. A process for hardening a surface zone of a recess in an article comprising inserting an inductor in said recess in proximity with the said surface zone, supplying current to said inductor at a sufficiently high frequency and for a sufficiently limited period of time to maintain a core of the article substantially cool while said surface zone is heated to hardening temperature, interrupting said current, and permitting heat to flow from said surface zone into said core with sufficient rapidity to harden the surface zone.

12. A method of heat treating an article having an internal recess, comprising inserting an inductor in said recess, connecting said inductor to a source of high frequency current whereby an internal surface zone adjacent to said inductor is heated to the critical temperature and controlling the heating current generated in the article so that substantially only the internal zone to be hardened reaches a temperature above the critical temperature and so that the cooling action of the metal adjacent to the heated zone chills said zone to harden it.

13. A method of heat treating an article having an internal recess, comprising inserting an inductor in said recess, connecting said inductor to a source of high frequency current whereby an internal surface zone adjacent to said inductor is heated to the critical temperature, fluid quenching a heated zone that has reached the critical temperature so as to harden that cooled zone, the heating current generated in the article and the quenching being so controlled and timed that substantially only the internal zone to be hardened is at or above the critical temperature at the time the quenching becomes effective.

FRANCIS S. DENNEEN.
WILLIAM C. DUNN.